United States Patent
Plazarte (10) Patent No.: US 12,303,071 B2
(45) Date of Patent: May 20, 2025

(54) BLENDER SOUND SHIELD

(71) Applicant: Sunbeam Products, Inc., Boca Raton, FL (US)

(72) Inventor: Enrique Plazarte, Fort Lauderdale, FL (US)

(73) Assignee: Sunbeam Products, Inc., Atlanta, GA (US)

( * ) Notice: Subject to any disclaimer, the term of this patent is extended or adjusted under 35 U.S.C. 154(b) by 427 days.

(21) Appl. No.: 17/938,068

(22) Filed: Oct. 5, 2022

(65) Prior Publication Data

US 2023/0103315 A1  Apr. 6, 2023

Related U.S. Application Data

(60) Provisional application No. 63/252,758, filed on Oct. 6, 2021.

(51) Int. Cl.
*A47J 43/07* (2006.01)
*A47J 43/046* (2006.01)

(52) U.S. Cl.
CPC ......... *A47J 43/0716* (2013.01); *A47J 43/046* (2013.01); *A47J 43/0727* (2013.01)

(58) Field of Classification Search
CPC ............... A47J 43/0727; A47J 43/0716; A47J 47/0727; A47J 43/046
See application file for complete search history.

(56) References Cited

U.S. PATENT DOCUMENTS

| | | | |
|---|---|---|---|
| 10,399,050 B1* | 9/2019 | Bertsch | A47J 43/042 |
| 10,517,436 B2* | 12/2019 | Arnett | A47J 43/046 |
| 2004/0032791 A1* | 2/2004 | Gauss | A47J 43/1006 366/205 |
| 2006/0120215 A1* | 6/2006 | Sands | A47J 43/0727 366/205 |
| 2014/0247686 A1* | 9/2014 | Arnett | A47J 43/0772 366/205 |
| 2019/0133378 A1* | 5/2019 | Kim | A47J 43/046 |
| 2020/0205613 A1* | 7/2020 | Kolar | A47J 43/046 |
| 2022/0386821 A1* | 12/2022 | Ye | A47J 43/0716 |
| 2023/0022197 A1* | 1/2023 | Kim | A47J 43/0727 |

FOREIGN PATENT DOCUMENTS

WO  WO-2022116793 A1 *  6/2022

OTHER PUBLICATIONS

Translation of WO-2022116793 (Year: 2022).*

* cited by examiner

*Primary Examiner* — Bobby Yeonjin Kim
(74) *Attorney, Agent, or Firm* — Husch Blackwell LLP (57) ABSTRACT

A blender system is provided that includes a first jar, and second jar, and a blender base. The blender system is operable in a first mode wherein the first jar is coupled to the blender base and the objects within the first jar are blended or processed. The blender system is also operable in a second mode wherein the first jar and the second jar are coupled to the blender base. In this configuration, the objects to be processed are contained within the second jar. Advantageously, in the second mode, the first jar acts as a sound shield by which the sound generated by the blending process is dampened, resulting in a quieter experience for the user.

14 Claims, 5 Drawing Sheets

BLENDER SOUND SHIELD

CROSS-REFERENCE TO RELATED APPLICATIONS

This Application claims priority to U.S. Provisional Patent Application Ser. No. 63/252,758, filed on Oct. 6, 2021, entitled "BLENDER SOUND SHIELD," currently pending, the entire disclosure of which is incorporated herein by reference.

FIELD OF INVENTION

The present invention relates generally to a blender, and more particularly to a blender with a jar that can function as a sound shield.

BACKGROUND OF INVENTION

Food processors make preparing snacks or meals in the home much more convenient for consumers. Food processors and similar appliances allow consumers to prepare food with minimal effort. The appliances also save consumers money by allowing them to prepare food in their homes instead of purchasing expensive prepared food from a restaurant or a store. One food processing appliance found in most modern homes is the blender. Blenders may, for example, crush, blend, pulverize, or otherwise process food with ease. With their powerful motors and sharp blades, blenders allow consumers to easily prepare tasty treats (e.g., slushies and milkshakes) and full meals (e.g., smoothies and protein shakes) at their convenience.

Unfortunately, blenders are a major source of noise pollution in the home. A powerful motor is often used to rotate the blender's blades at a high rotational speed. The motor itself, the whirling of the blades, and the processing of solids within the blender can generate a substantial amount of noise. Thus, some consumers have resorted to purchasing standalone sound shields that can surround the blender and reduce the perceived loudness of the noise generated by the blender.

However, standalone sound shields are not an ideal solution for reducing the noise generated by blenders. Such sound shields are expensive because they have thick sidewalls that are composed of a large amount of plastic material. Also, the standalone sound shields generally have no other use besides reducing the noise generated by the blender. Finally, the standalone sound shields are bulky because they must cover the entire blender base and associated blender jar, making the sound shields inconvenient for consumers to store.

SUMMARY OF INVENTION

The present invention overcomes many of the shortcomings and limitations of the prior art devices discussed above. The invention includes several embodiments of a blender system including a first jar with a dual function. Like a traditional blender jar, the first jar may provide a vessel in which food can be contained and processed by the blender. However, unlike traditional blender jars, the first jar may also be positioned around and exterior to a second, smaller jar to act as a sound shield to reduce the volume of sounds generated by the blender when food is being processed in the second jar.

The blender system may be operated by the user in at least two operational modes. In a first operational mode, the first jar may function similarly to a traditional blender jar. The first jar is adapted to be coupled to a jar nut having a blade assembly and positioned on a blender base to allow the blade assembly to engage with a motor. A user may load food into the first jar and activate a motor assembly within the blender base to process food contained within the first jar.

In a second operational mode, the first jar may function as a sound shield that reduces the noise generated by the blender during use. In the second operational mode, both the first jar and the second jar may be coupled to the blender base at the same time. The second jar is configured so that it can be coupled to a jar nut and contain the food to be processed. When food is being processed in the second jar, the first jar may substantially surround the second jar to help isolate the second jar from the surrounding environment. The first jar can thus reduce the volume of sound produced by the blender when in use, eliminating the need for a standalone sound shield.

A general symmetry of the first jar may help facilitate the dual functionality of the first jar. The first jar may have a body including a first opening at a first end of the body and a second opening at a second end of the body. The first and second openings may substantially be the same size and may be positioned opposite of each other. In the first operational mode, the first opening may be coupled with the blender base, while in the second operational mode, the second opening may be coupled with the blender base.

These and other aspects and advantages of the present invention will become apparent to those skilled in the art after considering the following detailed description in connection with the accompanying drawings.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures. As used herein, the term "food" may include not only ingredients that one may consume for sustenance but also may include other ingredients or items that the user desires to add to the blender system. The food added to the blender system may be in the form of a solid, a liquid, or a gas.

Figure 1:
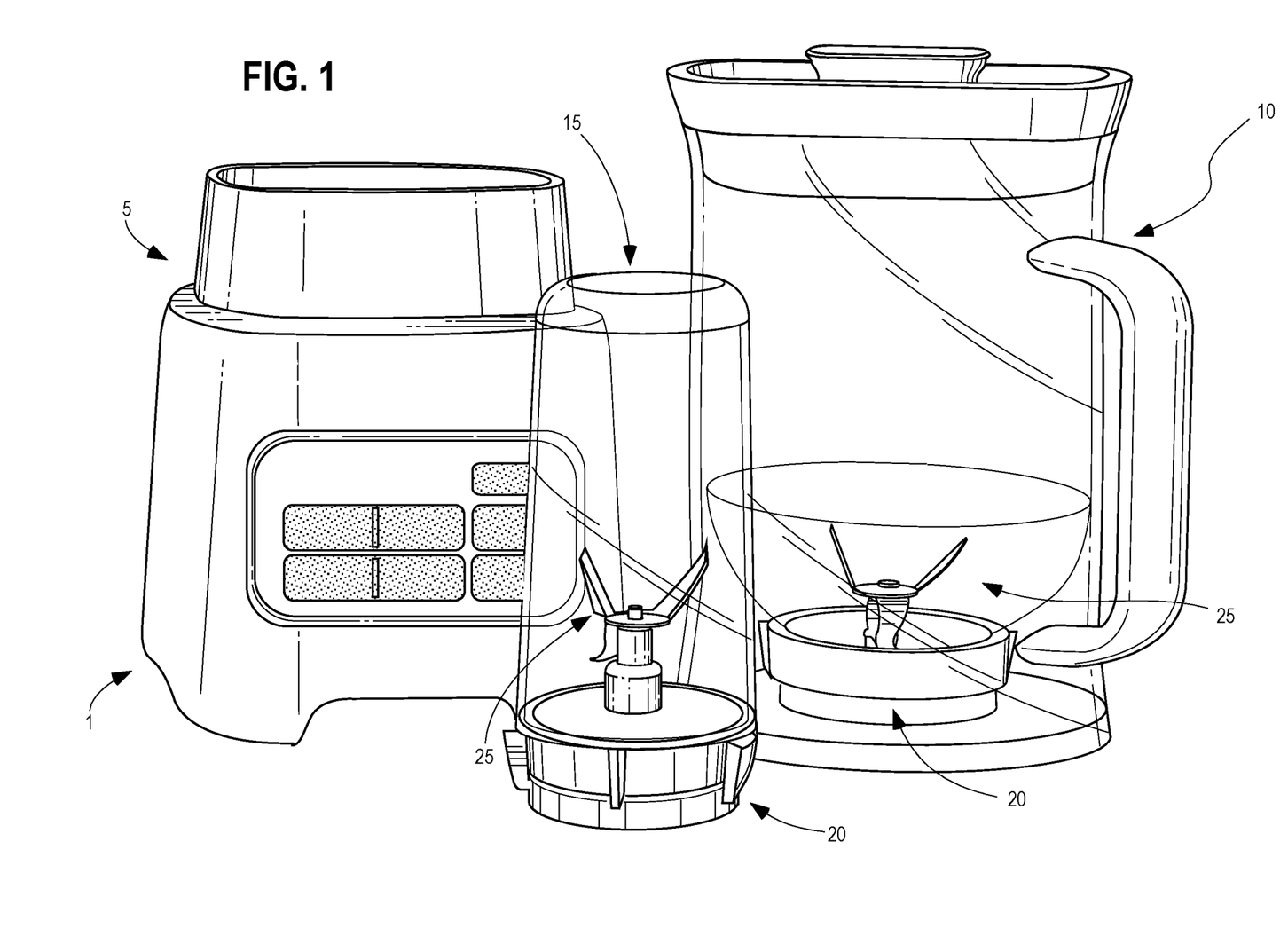
FIG. 1 is an isometric drawing of a blender system including a blender base, a first jar, and a second jar, the blender system constructed according to the teachings of the present invention.

FIG. 1 illustrates a blender system 1 that comprises a blender base 5, a first jar 10, and a second jar 15. The first jar 10 may be larger in volume than the second jar 15. When a user wishes to process food, he or she may load either the first jar 10 or the second jar 15 with food and position the selected jar on the blender base 5. The user may select the first jar 10 or the second jar 15 depending on the amount of food the user wishes to process in the blender system 1. As a non-limiting example, because the first jar 10 may have a larger internal volume than the second jar 15, the user may decide to process larger amounts of food within the first jar 10 and smaller amounts of food within the second jar 15. However, as would be understood by those skilled in the art, the user may also use the first jar 10 to process small amounts of food.

The blender system 1 may include at least two operational modes related to the jars 10, 15. In a first operational mode, the first jar 10 may be coupled to the blender base 5 and a jar nut 20. Then, food may be processed within the first jar 10 by a blade assembly 25. In a second operational mode, both the first jar 10 and the second jar 15 may be coupled to the blender base 5. In this configuration, the first jar 10 may surround the second jar 15 while the second jar 15 is coupled to the jar nut 20. Thus, in the second operational mode, food in the second jar 15 may be processed by the blade assembly 25. Advantageously, as explained in more detail below, the first jar 10 may act as a sound shield that decreases the amount of noise generated by the blender system 1 when it is processing food.

Although the first and second operational modes are described herein, the user may engage the blender system 1 in yet other operational modes. For example, in a third operational mode, the user may couple only the second jar 15 to the blender base 5. In further operational modes, the user may couple other jars with the blender base 5 besides the first jar 10 and the second jar 15. Yet further modes of operation that capture the spirit of this invention would be appreciated by those skilled in the art.

When the user desires to process food in any known or foreseeable operational modes, the user may selectively couple the jar nut 20 to the blender base 5 and to either the first jar 10 or the second jar 15. The jar nut 20 may be rotatably coupled, threadedly coupled, or coupled via a friction fit to the first jar 10 and/or the second jar 15. The same jar nut 20 may be used with both the first jar 10 and the second jar 15, although it is foreseeable that the jars 10, 15 could be selectively coupled to different jar nuts. The jar nut 20 may include the blade assembly 25 that is rotatably coupled to the jar nut 20. The blade assembly 25 may crush, blend, pulverize, stir, or otherwise process food as desired by the user.

In alternative embodiments of the invention, the blade assembly 25 may be coupled with the first jar 10 and/or the second jar 15 without a jar nut. In these embodiments, the first jar 10 and/or the second jar 15 may couple to the blender base 5 without the aid of a jar nut. In other embodiments of the invention, the first jar 10 and the second jar 15 may couple to either the same blade assembly or different blade assemblies, regardless of whether a jar nut is provided.

Figure 2:
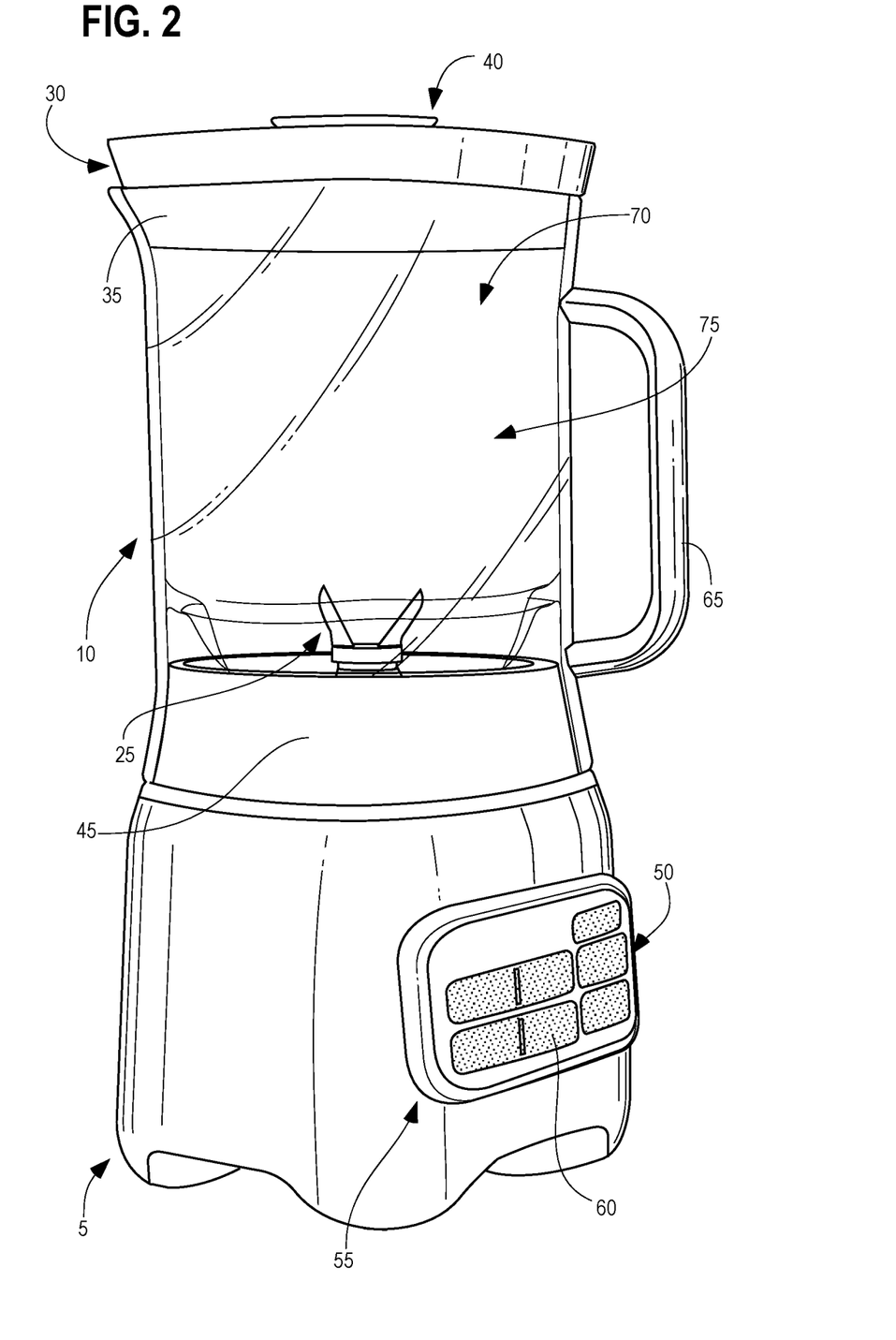
FIG. 2 is an isometric drawing of the blender system of FIG. 1 in a first operational mode, wherein the first jar is coupled to the blender base.

Turning to FIG. 2, the blender base 5 and the first jar 10 are configured for the first operational mode. In the first operational mode, a lid 30 may be coupled to a first end 35 of the first jar 10. The lid 30 may help prevent food from spilling out of the first jar 10 while the food is being processed. When the first jar 10 is engaged with the blender base 5, a user may load food into the first jar 10 by removing the lid 30 from the first end 35 and placing food into the first jar 10. The user may also load food into the first jar 10 before placing the first jar 10 onto the blender base 5. In addition, the first jar 10 may be loaded with food before the lid 30 is coupled to the first end 35. Alternatively, instead of removing the lid 30 to add food to the first jar 10, the user may remove a cap member 40 from within the lid 30. Removing the cap member 40 may expose an opening (not illustrated) in the lid 30 that may allow the user to place food into the first jar 10 through the lid 30.

The first jar 10 may also have a second end 45 coupled to the jar nut 20 (not illustrated). In this configuration, the blade assembly 25 may be positioned near the second end 45. To activate the blender base 5 and operate the blade assembly 25, the user may engage an interface 50. The interface 50 may be positioned on a face 55 of the blender base 5, although other locations for the interface 50 are foreseeable.

As understood in the art, the interface 50 may be adapted to receive inputs that allow a user to select from one or more food processing options including, but not limited to, blend, crush, pulse, and puree. Also, the interface 50 may include a timing feature that will activate the blender base for a predetermined time or at a selected time. Moreover, the interface 50 may allow a user to turn the blender base 5 on and off as desired. Furthermore, the interface 50 may allow the user to control the rotational speed of the blade assembly 25.

In the illustrated embodiment, the interface 50 may be engaged by buttons 60. A food processing action may be activated when the user presses a button 60. The buttons 60 may be mechanical in nature such that pressing the button 60 engages a mechanical relay that allows the blender base 5 to carry out a food processing action. Alternatively, the interface 50 may be a touch screen and the buttons 60 may be capacitive sensors. In this embodiment, the buttons 60 may be linked to a computerized processing unit (not illustrated) that activates a food processing action when the buttons 60 are touched or pressed. In yet other embodiments, the buttons 60 may instead be knobs or other input devices that allow a user to control the blender base 5, as would be appreciated by those skilled in the art.

The first jar 10 may have a handle 65 adapted to assist the user in maneuvering the first jar 10. For example, the handle 65 may assist the user in moving the first jar 10 on and off the blender base 5. The handle 65 may provide a convenient location where the user can grip the first jar 10 with the user's fingers or hands. The handle 65 may be provided in a U-shape and is affixed to a body 70 of the first jar 10, although other shapes for the handle 65 are foreseeable.

The body 70 of the first jar 10 may have a general symmetry that allows the first jar 10 to be used in both the first operational mode and second operational mode. More particularly, in one embodiment, the body 70 may be provided as an open cylinder, although other substantially or completely symmetrical shapes are foreseeable. In addition, the ends 35, 45 may be substantially the same size and shape and positioned substantially opposite of each other on the body 70. In the illustrated embodiment, the diameter of the body 70 increases from a center 75 toward each of the first end 35 and the second end 45. In alternative embodiments of the invention, the diameter of the body 70 may be substantially constant between the ends 35, 45. In yet other embodiments, the general symmetry of the first jar 10 may be limited to the ends 35, 45 being substantially the same size and positioned on opposite ends of the body 70.

Figure 3:
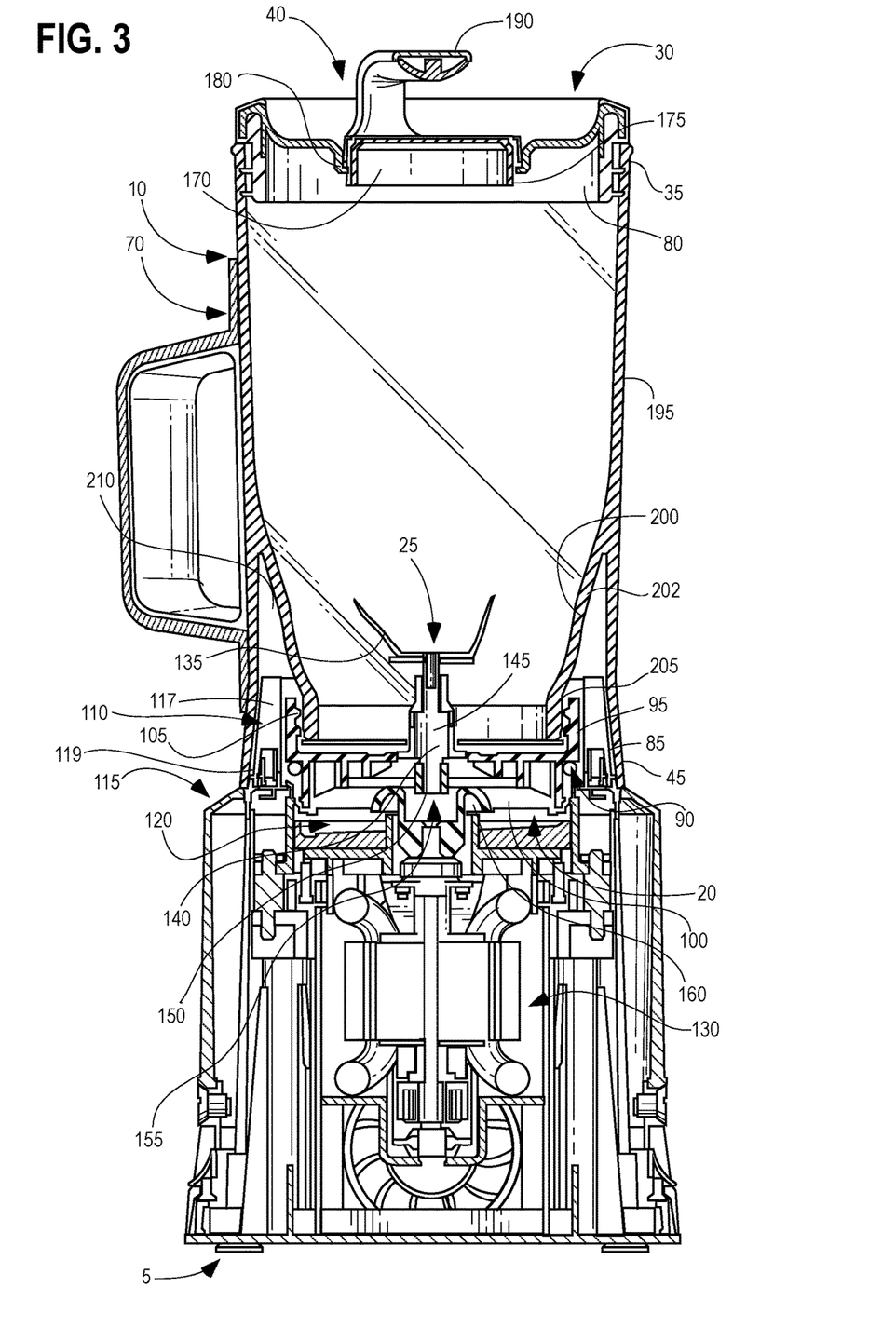
FIG. 3 is a cross-sectional drawing of the first jar and blender base of FIG. 2.

Turning to FIG. 3, the general symmetry of the first jar 10 is further illustrated. For example, the ends 35, 45 have openings 80 and 85, respectively, that are substantially the same size. Because the openings 80, 85 are substantially the same size, either of the ends 35, 45 may be coupled to the blender base 5 or to the lid 30. Thus, while the lid 30 is currently received in the opening 80 and the blender base 5 is received within the opening 85, the first jar 10 could be flipped vertically such that the first end 35 may couple to the blender base 5 and the second end 45 may couple to the lid 30. Therefore, as would be appreciated by those skilled in the art, many of the teachings related to coupling the first end 35 to the lid 30 may also apply to the second end 45. Further, many of the teachings related to coupling the second end 45 to the blender base 5 may also apply to the first end 35.

In the first operational mode, the jar nut 20 may be coupled to both the blender base 5 and the first jar 10. The jar nut 20 may have a body 90 provided in the form of concentric discs 95, 100, although other shapes are foreseeable. The disc 95 may be positioned above the disc 100 and may be larger than the disc 100, although in other embodiments the discs 95, 100 may be substantially the same size. Further, the disc 95 preferably includes threads 105 that may engage with corresponding threads of the first jar 10 (not illustrated) such that the first jar 10 may be threadingly coupled to the jar nut 20. In alternative embodiments of the invention, the threads 105 may be provided on the disc 100. If the jar nut 20 is provided without threads 105, the first jar 10 could be secured to the jar nut 20 via a friction fit or other attachment means, as would be appreciated by those skilled in the art.

The jar nut 20 may be received within a securing member 110 of the blender base 5 that may keep the jar nut 20 in position when it is placed onto the blender base 5. The securing member 110 preferably extends upwardly from a top surface 115 of the blender base 5. The securing member 110 may be provided in the form of a ring that may be affixed, attached, or coupled to the top surface 115. The diameter of the securing member 110 may be slightly larger than the diameter of the jar nut 20 so that when the jar nut 20 is received within the securing member 110, the securing member 110 may completely, substantially, or partially surround the jar nut 20. The securing member 110 may help hold the jar nut 20 in place via a friction fit, via a rotatable attachment mechanism, or via a threadable attachment mechanism, as would be appreciated by those skilled in the art.

The openings 80, 85 of the first jar 10 may be slightly larger than the securing member 110. As illustrated, the opening 85 may substantially surround the securing member 110 so that the securing member 110 may provide additional support to help hold the first jar 10 in position when the first jar 10 is coupled with the blender base 5. Further, because of the general symmetry of the first jar 10, this additional support may be provided when either the first end 35 or the second end 45 is coupled to the blender base 5. In addition, the diameter of the securing member 110 may increase from an upper portion 117 until a lower portion 119. The increase in diameter of the securing member 110 may complement an increase of the diameter of the ends 35, 45 such that the securing member 110 may help provide a more secure fit between the first jar 10 and the blender base 5.

In addition to the securing member 110, a cavity 120 may be provided in the top surface 115 to help retain the jar nut 20 on the blender base 5. The cavity 120 may be a shallow recess positioned at the center of the top surface 115, although other positions and shapes for the cavity 120 are foreseeable. The diameter of the cavity 120 may be slightly larger than the diameter of the disc 100 such that the disc 100 may be received within the cavity 120. The disc 100 may be retained within the cavity 120 via a friction fit, a threadable attachment means, or a rotatable attachment means as would be appreciated by those skilled in the art.

When the jar nut 20 is coupled to the blender base 5, the blade assembly 25 may be coupled to a motor assembly 130 housed within the blender base 5. The motor assembly 130 may operate using known or foreseeable mechanics to rotate the blade assembly 25 such that the blender system 1 (not illustrated) may process food placed in the jars 10, 15. In particular, the motor assembly 130 may cause blades 135 of the blade assembly 25 to rotate at a speed such that the food within the first jar 10 is processed as desired by the user.

The motor assembly 130 may act according to inputs from the interface 50 (not illustrated). Different inputs may allow the blender system 1 to process food in different ways. For example, in a pulse mode, the motor assembly 130 may operate through general motor mechanics to cause the blades 135 to alternate between faster and slower rotational speeds. As a further example, the motor assembly 130 may be operated at predetermined power levels such that the blades 135 rotate at different rotational speeds corresponding to the power levels.

The blade assembly 25 may be coupled to the motor assembly 130 via a rotatable portion 140 retained within the jar nut 20. The rotatable portion 140 may be a cylinder with a top portion 145 upon which the blades 135 are attached, although other shapes for the rotatable portion 140 are foreseeable. The rotatable portion 140 may extend downwardly through the jar nut 20 and towards the center of the top surface 115 of the blender base 5. When the jar nut 20 engages with the blender base 5, a bottom portion 150 of the rotatable portion 140 may be received into a corresponding bore 155 of the blender base 5. The bore 155 may be an open channel that is substantially the same size as, or somewhat larger or smaller than, the rotatable portion 140. The rotatable portion 140 may be secured in the bore 155 via a friction fit or another coupling means as would be appreciated by those skilled in the art. The bore 155 may be an open channel that extends downwardly through the blender base 5 and may be coupled to the motor assembly 130. The bore 155 and the motor assembly 130 may be coupled such that when the motor assembly 130 is activated, the bore 155 rotates. Due to a friction force between the rotatable portion 140 and the bore 155, the rotation of the bore 155 may cause a corresponding rotation of the blade assembly 25.

In some embodiments of the invention, the bore 155 may have clamps that provide an inwardly directed force. In such an embodiment, a user may exert a downward force on the first jar 10 (and thus the jar nut 20) when coupling the first jar 10 and the jar nut 20 to the blender base 5. The downward force applied by the user may cause the clamps to retreat into the bore 155 as the rotatable portion 140 enters the bore 155. Once the user no longer applies a downward force, the force applied by the clamps to the rotatable portion 140 may help secure the rotatable portion 140 in position during use.

The blender base 5 may further include a fixation member 160 adapted to assist the user in positioning the first jar 10 prior to its use. The fixation member 160 may be provided as a raised protrusion above the top surface 115. As such, as the user positions the first jar 10 on the blender base 5, the fixation member 160 may supply tactile feedback to help the user determine if the jar nut 20 is in the correct position on the blender base 5. As an additional benefit, the fixation member 160 may also help secure the jar nut 20 (and thus, the first jar 10) in position. The fixation member 160 may extend upwardly from the top surface 115 such that it may be received into a corresponding divot (not illustrated) within the disc 100 of the jar nut 20. In the illustrated embodiment, the fixation member 160 is provided in the form of a quarter-cylinder that extends around the circumference of the bore 155, although other positions and shapes for the fixation member 160 are foreseeable.

In the first operational mode, the first end 35 of the first jar 10 may be engaged with the lid 30. The lid 30, as illustrated, may engage with the first end 35 via threads 165 provided on the lid 30, although in other embodiments the lid 30 may be secured via a friction fit. Further, the lid 30 may include an aperture 170 disposed near a center of the lid 30. A lip member 175 may extend into the aperture 170 and may engage with a protrusion 180 of the cap member 40. The lip member 175 may help prevent the cap member 40 from falling into the first jar 10 when the cap member is coupled with the lid 30. The protrusion 180 may be a thin ring that extends around a body of the cap member 40 such that a portion of the cap member 40 may extend into the body 70 of the first jar 10. Further, the diameter of the protrusion 180 may be slightly larger than the diameter of the aperture 170 such that the protrusion 180 may rest on the lip member 175.

The cap member 40 may also include a handle 190 that extends upwardly from the body of the cap member 40. The handle 190 may assist the user in removing the cap member 40 from the lid 30, such that the user may access the aperture 170 of the lid 30. When the user can access the aperture 170, the user may add additional food to the first jar 10 without removing the lid 30 from the first jar 10. In addition, this may allow for the lid 30 to provide some splash protection for the user while food is being added to the first jar 10.

The body 70 of the first jar 10 may further include an outer wall 195 that is generally symmetrical such that the first jar 10 can be used in the first and second operational modes. The outer wall 195 preferably substantially extends across the entire height of the first jar 10, and more particularly from its first end 35 to its second end 45. An inner wall 200 may also be provided that is integrally formed with the outer wall 195. In other embodiments of the invention, the inner wall 200 may be formed as a separate piece affixed to the outer wall 195 via glue, snap means, or other attachment means that would be appreciated by those skilled in the art.

The inner wall 200 has a first end 202 that abuts the outer wall 195 and a second end 205 that abuts the jar nut 20. The second end 205 may terminate before it abuts the second end 45 of the first jar 10. This may allow for the second end 45 of the first jar 10 to extend substantially over the top surface 115 of the blender base 5 while also allowing for the jar nut 20 to engage with the blender base 5.

The inner wall 200 may be tapered towards the second end 205 such that it decreases in diameter from the first end 202 to the second end 205. As such, during operation of the blender system 1, food may be funneled to the blade assembly 25. In alternative embodiments of the invention, instead of being tapered, the inner wall 200 may have a general symmetry similar to the outer wall 195. In this regard, the first jar 10 may not be symmetrical, and yet still its overall general shape may be symmetrical.

The outer wall 195 may substantially surround the inner wall 200 such that a cavity 210 is defined by the outer wall 195, the inner wall 200 and the blender base 5. The cavity 210 may further help reduce noise generated by operation of the blade assembly 25 and the various components that operate the blade assembly 25.

Figure 4:
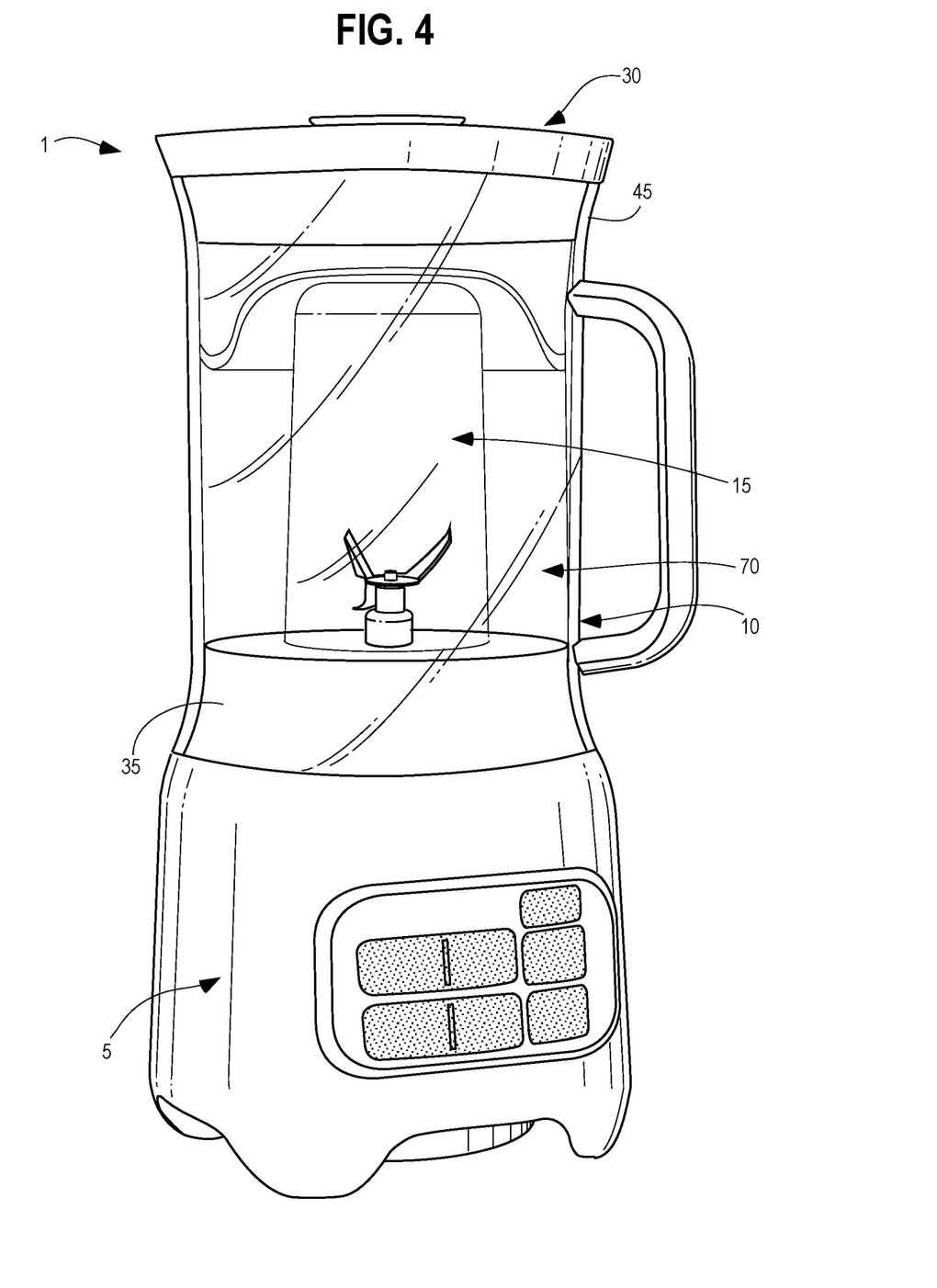
FIG. 4 is an isometric drawing of the blender system of FIG. 1 in a second operational mode, wherein the first jar and the second jar are coupled to the blender base, and the first jar substantially encloses the second jar.
Figure 5:
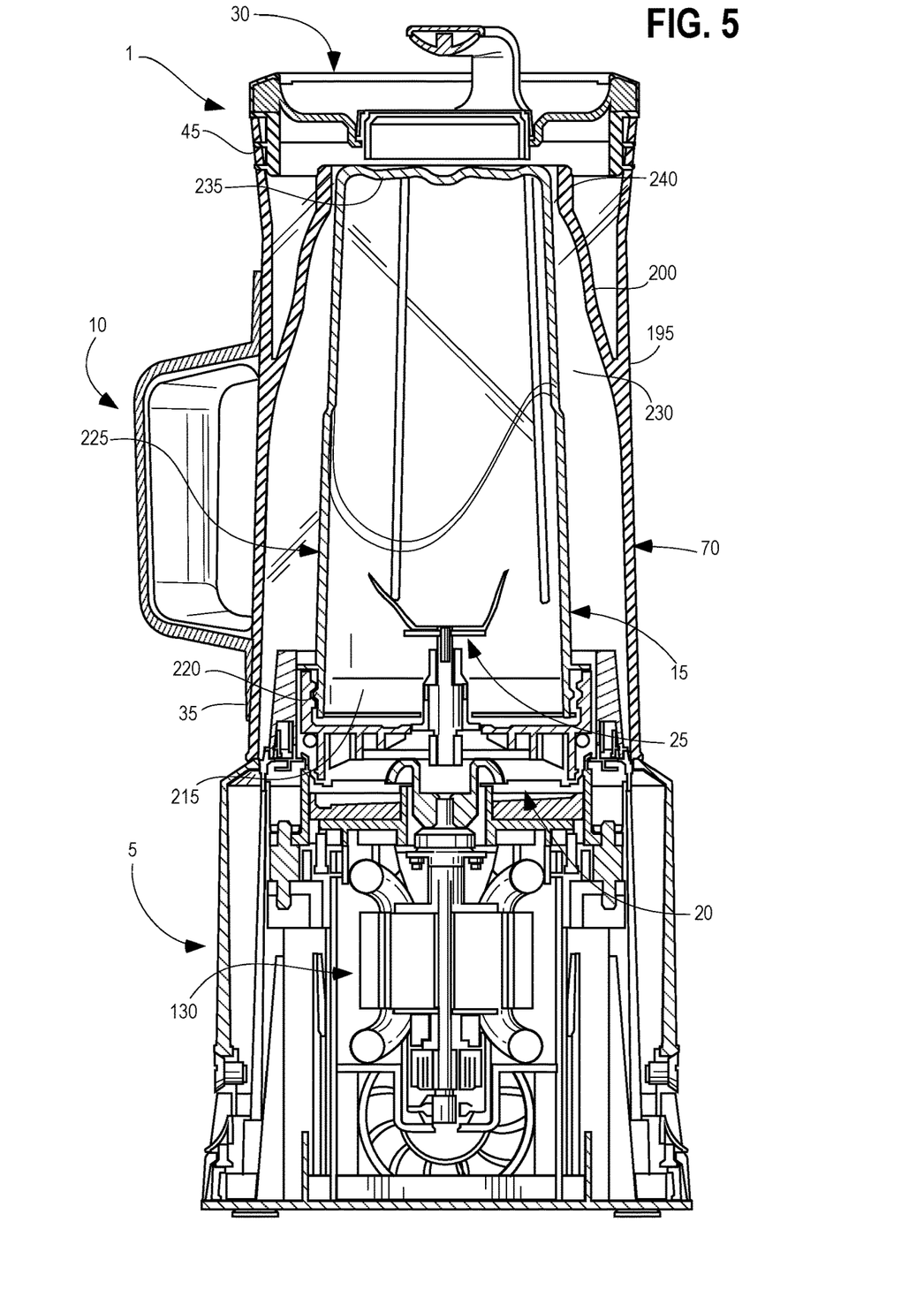
FIG. 5 is a cross-sectional drawing of the blender system of FIG. 4.

FIGS. 4 and 5 illustrate the blender system 1 in the second operational mode. A user may utilize the blender system 1 in the second operational mode when he or she wishes to blend an amount of food that can be retained within a volume of the second jar 15. Further, the second jar 15 may allow for a user to take food "on the go" after the food is processed by the blender system 1. When the user wishes to take the second jar 15 "on the go," the user may affix a lid (not illustrated) to the second jar 15 to help prevent the blended food from spilling out of the second jar 15.

In FIG. 4, the first jar 10 is vertically inverted from its position in FIGS. 1-3. Thus, the first end 35 is engaged with the blender base 5 while the second end 45 is engaged with the lid 30. The general symmetry of the body 70, and particularly the general symmetry of the outer wall 195, may allow for the first jar 10 to be placed into this configuration.

In the second operational mode, the second jar 15 is coupled with the blender base 5 and the jar nut 20 (not illustrated). At the same time, the second jar 15 is housed within the first jar 10. Advantageously, arranging the blender base 5 and the jars 10, 15 in this manner may allow for the first jar 10 to act as a sound shield when food is being blended within the second jar 15. The material that comprises the first jar 10 may absorb a portion of the energy from the sound waves generated by the blending process. Because a portion of the sound waves' energy is dissipated by the first jar 10, the user may perceive the blender as operating more quietly. In addition, if an air gap is provided between the outer wall 195 and the inner wall 200, the air gap may provide the first jar 10 with additional sound reduction capabilities.

As generally understood by those in the art, the perceived loudness (or volume) of sound waves may be decreased in several different ways. One such way is to make sound waves travel a greater distance, as they generally decrease in energy (and thus, perceived loudness) the further distance they travel from their source. Another method is to provide substances that can absorb energy from the sound waves. When a sound wave travels through a solid, some of the sound wave's energy will dissipate as the sound wave travels through the solid. The first jar 10 may be composed of a material that may dissipate a substantial portion of the sound waves' energy, or the first jar 10 may be composed of a more traditional material, such as plastic or glass.

To blend food in the second operational mode, the user may first load the second jar 15 with food. Then, the user may couple the jar nut 20 to the second jar 15. Next, the user may position the second jar 15 on the blender base 5 such that both the second jar 15 and the jar nut 20 may couple to the blender base 5 in a method substantially similar to coupling the first jar 10 to the blender base 5. A user may then position the first jar 10 over the second jar 15 and move the first jar 10 downwardly to couple the first jar 10 to the blender base 5.

Turning to FIG. 5, an open end 215 of the second jar 15 may couple to the jar nut 20 in substantially the same manner as the first jar 10 may couple to the jar nut 20. In addition, the second jar 15 may have a lip member 220 that circumferentially projects outwardly away from a body 225 of the second jar 15. The lip member 220 may help secure the second jar 15 against the jar nut 20 and/or the securing member 110 to provide the second jar 15 with greater stability when the second jar 15 is attached to the blender base 5.

When the blender system 1 is in the second operational mode, the blade assembly 25 may be coupled to the motor assembly 130 in substantially the same manner as in the first operational mode. Further, like in the first operational mode, the motor assembly 130 may, through general motor mechanics, rotate the blade assembly 25. The rotation of the blade assembly 25 may crush, blend, pulverize, or otherwise process food in the second jar 15 as desired by the user. Furthermore, the user may engage the interface 50 (not illustrated) to select between the different processing options provided by the blender system 1 to process the food within the second jar 15.

The body 70 of the first jar 10 may substantially surround the second jar 15. A gap 230 may be provided between the second jar 15 and the inner wall 200 of the first jar 10. The gap 230 may help prevent vibrations generated by the blade assembly 25 during food processing from being transmitted from the second jar 15 to the first jar 10. This may assist the blender system 1 in operating more quietly. In alternative embodiments, the gap 230 may not be provided, and the second jar 15 may abut the surface of the inner wall 200.

A base end 235 of the second jar 15 may be received within an aperture 240 of the inner wall 200. The base end 235 may be positioned opposite of the open end 215. The base end 235 may have substantially the same or a somewhat smaller diameter than the aperture 240. The base end 235 of the second jar 15 may substantially occupy the volume of the aperture 240 such that sound waves generated by processing the food within the second jar 15 may be forced to travel through the inner wall 200 before exiting the body 70 of the first jar (which may enhance the sound reduction capabilities of the first jar 10). In alternative embodiments of the invention, the second jar 15 may be smaller such that the base end 235 does not extend into the aperture 240, or the second jar 15 may be larger such that the base end 235 extends through the aperture 240.

The lid 30 may also help reduce the volume of the sound waves generated by the blending process during the second operational mode. The lid 30 may be coupled to the second end 45 in substantially the same manner as it coupled to the first end 35. When the lid 30 is coupled to the second end 45, it may absorb some of the energy of the sound waves generated by the blending process such that the user perceives that the blender system 1 is operating more quietly.

A method of reducing the perceived loudness of sound waves generated by a blender system is also provided. The method may utilize any of the components of the blender system 1 previously described herein. The method may comprise the steps of: providing a first jar 10, a second jar 15, and a blender base 5; engaging the second jar 15 with the blender base 5; placing the first jar 10 over the second jar 15 and the blender base 5; and moving the first jar 10 in a downwards direction until the first jar 10 engages with the blender base 5.

In some embodiments, the method may further include the steps of loading the second jar 15 with at least one item, and operating the blender system 1 in the second operational mode wherein the at least one item is processed in the second jar. In other embodiments, the method may further include the step of activating the blender system 1 by engaging with an interface 50 of the blender system 1. In yet other embodiments, the method may further include the step of coupling the lid 30 on the first end 35 of the first jar 10.

In any of the provided methods, when both the first jar 10 and the second jar 15 engage the blender base 5, the first jar 10 may substantially surround the second jar 15. In addition, the first jar 10 may have a first volume, the second jar 15 may have a second volume, and the second volume may be smaller than the first volume.

As is evident from the foregoing description, certain aspects of the present invention is not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. In addition, unless mention was made above to the contrary, it should be noted that all of the accompanying drawings are not to scale. All such changes, modifications, variations and other uses in applications which do not depart from the spirit and scope of the present inventions are deemed to be covered by the inventions which are limited only by the claims which follow.

The invention claimed is:

1. A blender system comprising:
   a blender base;
   a first jar;
   a second jar smaller than the first jar, wherein the first jar and the second jar are each adapted to couple to the blender base;
   at least one blade assembly, the at least one blade assembly couplable to at least one of the first jar and the second jar;
   wherein in a first operational mode the first jar is coupled to the blender base; and
   wherein in a second operational mode, the first jar and the second jar are coupled to the blender base, and the first jar substantially surrounds the second jar.

2. The blender system of claim 1, wherein the first jar includes an upper end and a lower end that are substantially symmetrical.

3. The blender system of claim 2, wherein the upper end and the lower end of the first jar are each configured to couple to a securing member of the blender base, and wherein a first diameter of an upper portion of the securing member is different than a second diameter of a lower portion of the securing member.

4. The blender system of claim 2, wherein each of the upper end and the lower end of the first jar are couplable to a lid and the blender base.

5. The blender system of claim 1, the blender base further including an interface adapted to receive at least one input corresponding to at least one food processing option.

6. The blender system of claim 1, wherein an opening of the first jar is adapted to couple to the at least one blade assembly.

7. The blender system of claim 1, wherein a first volume of the blender system in the second operational mode is less than a second volume of the blender system in the first operational mode.

8. A blender system for processing food, the blender system comprising:
   a blender base;
   a first jar including:
      a first body having a first volume;
      a first end and a second end positioned opposite of each other on the first body; and
      wherein both the first end and the second end are couplable to the blender base;
   a second jar including a second body having a second volume, and wherein the second jar is couplable to the blender base;

wherein the first volume is greater than the second volume; and wherein, when both the first jar and the second jar are coupled to the blender base, the first body of the first jar substantially surrounds the second jar.

9. The blender system of claim 8, wherein in a first operational mode the first jar is coupled to the blender base, and wherein in a second operational mode the first jar and the second jar are coupled to the blender base.

10. The blender system of claim 9, wherein the first operational mode corresponds to a first perceived loudness, wherein the second operational mode corresponds to a second perceived loudness, and wherein the first perceived loudness is greater than the second perceived loudness.

11. The blender system of claim 8, further including a jar nut, and wherein the jar nut is couplable to the first jar and the second jar.

12. The blender system of claim 8, wherein the first body of the first jar is substantially symmetrical.

13. The blender system of claim 8, wherein the first end of the first jar includes a first opening, the second end of the first jar includes a second opening, and wherein the first opening and the second opening are substantially the same size.

14. The blender system of claim 8, wherein a blade assembly is coupled to a jar nut, and wherein the first jar, the second jar, and the blender base are selectively couplable to the jar nut.

\* \* \* \* \*